(12) United States Patent
Okuda

(10) Patent No.: US 8,923,367 B2
(45) Date of Patent: Dec. 30, 2014

(54) COMMUNICATION APPARATUS, COMMUNICATION SYSTEM, AND COMMUNICATION METHOD

(75) Inventor: Masato Okuda, Tokorozawa (JP)

(73) Assignee: Fujitsu Limited, Kawasaki (JP)

( * ) Notice: Subject to any disclaimer, the term of this patent is extended or adjusted under 35 U.S.C. 154(b) by 191 days.

(21) Appl. No.: 13/612,013

(22) Filed: Sep. 12, 2012

(65) Prior Publication Data

US 2013/0077659 A1 Mar. 28, 2013

(30) Foreign Application Priority Data

Sep. 28, 2011 (JP) ................................. 2011-213064

(51) Int. Cl.
*H04B 1/38* (2006.01)
*H04J 3/06* (2006.01)
(52) U.S. Cl.
CPC .................................... *H04J 3/0667* (2013.01)
USPC ........... 375/219; 375/354; 375/365; 370/469; 370/503

(58) Field of Classification Search
CPC .................................................... H04L 12/422
USPC .......................................................... 375/257
See application file for complete search history.

(56) References Cited

U.S. PATENT DOCUMENTS 8,155,157 B2 * 4/2012 Yang .............................. 370/503
8,532,241 B2 * 9/2013 Lee et al. ....................... 375/356
2004/0110510 A1 * 6/2004 Jeon et al. ...................... 455/450
2008/0186906 A1 8/2008 Defrance et al.
2010/0209070 A1 8/2010 Inomata

FOREIGN PATENT DOCUMENTS

| JP | 2008-193698 | 8/2008 |
| JP | 2010-190635 | 9/2010 |
| JP | 2010-213101 | 9/2010 |

OTHER PUBLICATIONS

The Precise Networked Clock Synchronization Working Group, "IEEE Standard for a Precision Clock Synchronization Protocol for Networked Measurement and Control Systems", IEEE Std 1588, 2008, pp. 1-289.

* cited by examiner

*Primary Examiner* — Lihong Yu
(74) *Attorney, Agent, or Firm* — Staas & Halsey LLP

(57) ABSTRACT

A communication apparatus including: a transmitter that transmits a first message to another communication apparatus, a receiver that receives a second message from the other communication apparatus, and a processor that performs time synchronization using the first message and the second message, wherein the processor generates information regarding a delay in the communication processing of the first message in the transmitter and the second message in the receiver in a communication layer in communication with the other communication apparatus, and the processor performs the time synchronization with the other communication apparatus based on the information regarding the delay in a time synchronization layer above the communication layer.

18 Claims, 15 Drawing Sheets

COMMUNICATION APPARATUS, COMMUNICATION SYSTEM, AND COMMUNICATION METHOD

CROSS-REFERENCE TO RELATED APPLICATION

This application is based upon and claims the benefit of priority of the prior Japanese Patent Application No. 2011-213064, filed on Sep. 28, 2011 the entire contents of which are incorporated herein by reference.

FIELD

Embodiments discussed herein are related to a communication apparatus, a communication system, and a communication method. The communication apparatus includes a communication apparatus that performs time synchronization with another communication apparatus.

BACKGROUND

As a protocol for synchronizing distributed clocks on a network, for example, IEEE 1588 (PTP: Precision Time Protocol) is defined (IEEE Std 1588, "IEEE Standard for a Precision Clock Synchronization Protocol for Networked Measurement and Control Systems").

In PTP, predetermined messages are exchanged between a device (a "master") that provides a time reference and a device (a "slave") that depends on a master, and the slave that achieves time synchronization with the master using the messages.

For example, a slave calculates the time difference (offset) between a master and the slave and the route delay (delay) that includes latency in a network and latency between the devices, corrects the clock based on the calculation results, thereby synchronizes the slave's time with the time of the master.

An example of time synchronization via PTP is illustrated in FIG. 1. As illustrated in FIG. 1, when receiving a synchronization message (Sync) from a master, a slave records the slave time t2 when the synchronization message is received (see "Timestamps known by slave" in FIG. 1).

In addition, when receiving a supplemental message (Follow_Up) from the master, the slave extracts, from the supplemental message, a time t1 when the synchronization message was transmitted by the master and records the time t1. The supplemental message is optional and may not be used. When the supplemental message is not used, the synchronization message includes the time t1 when the synchronization message was transmitted by the master, and the slave extracts the time t1 from the synchronization message and records it. The difference tms between the time t2 and the time t1 equals the sum (offset+delay) of the time difference (offset) between the master and the slave and the delay (delay).

Then, the slave transmits a delay information request message (Delay_Req) to the master. At this point, the slave records the slave time t3 when the delay information request message is transmitted.

When receiving the delay information request message from the slave, the master generates a delay information response message (Delay_Resp) that includes a time t4 that is when the delay information request message was received and transmits the delay information response message to the slave.

When receiving the delay information response message from the master, which is a response to the delay information request message, the slave extracts, from the delay information response message, the time t4 when the delay information request message was received by the matter and records it. The difference tsm between the time t4 and the time t3 is obtained by subtracting the time difference (offset) between the master and the slave from the delay (delay).

Accordingly, the time difference (offset) between the master and the slave is obtained by the following expression.

$$\text{Offset} = [tms - tsm]/2 = [(t2-t1)-(t4-t3)]/2 \qquad (1)$$

The slave achieves time synchronization with the master by correcting its time based on the time difference (offset) obtained as described above.

Japanese Laid-open Patent Publication No. 2010-213101 discloses a technique for achieving time synchronization at high precision by, for example, matching a transmission delay when messages are transmitted from a master node to a slave node and a transmission delay when messages are transmitted from the slave node to the master node.

Japanese Laid-open Patent Publication No. 2008-193698 discloses a technique for achieving clock synchronization at high precision in a wireless network that provides IP access by, for example, using frame pulses as the sampling points of a master counter and slave counter.

Japanese Laid-open Patent Publication No. 2010-190635 discloses a technique for achieving time synchronization at high precision by avoiding the use of the calculation results of an offset that includes an error for a time correction of the clock unit of the slave.

SUMMARY

According to an aspect of the invention, a communication apparatus includes: a transmitter that transmits a first message to another communication apparatus, a receiver that receives a second message from the other communication apparatus, and a processor that performs time synchronization using the first message and the second message, wherein the processor generates information regarding a delay in the communication processing of the first message in the transmitter and the second message in the receiver in a communication layer in communication with the other communication apparatus, and the processor performs the time synchronization with the other communication apparatus based on the information regarding the delay in a time synchronization layer above the communication layer.

The object and advantages of the invention is realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

When time synchronization is performed, a delay in communication processing may occur in a layer (a "lower layer") below the layer (an "upper layer") in which the time synchronization is performed.

However, since the upper layer does not recognize a delay in communication processing that occurred in the lower layer, it is difficult to correct a time error arising from a delay in the communication processing that occurs in the lower layer, and time synchronization may not be performed at high precision.

Embodiments of the present disclosure are described with reference to the drawings. However, the following embodiments are only examples and the application of numerous variations and techniques not described in the following embodiments and modifications are not excluded. That is, it is clear that the embodiments and modifications may be changed and applied if there is no departure from the spirit of the present disclosure.

Figure 1:
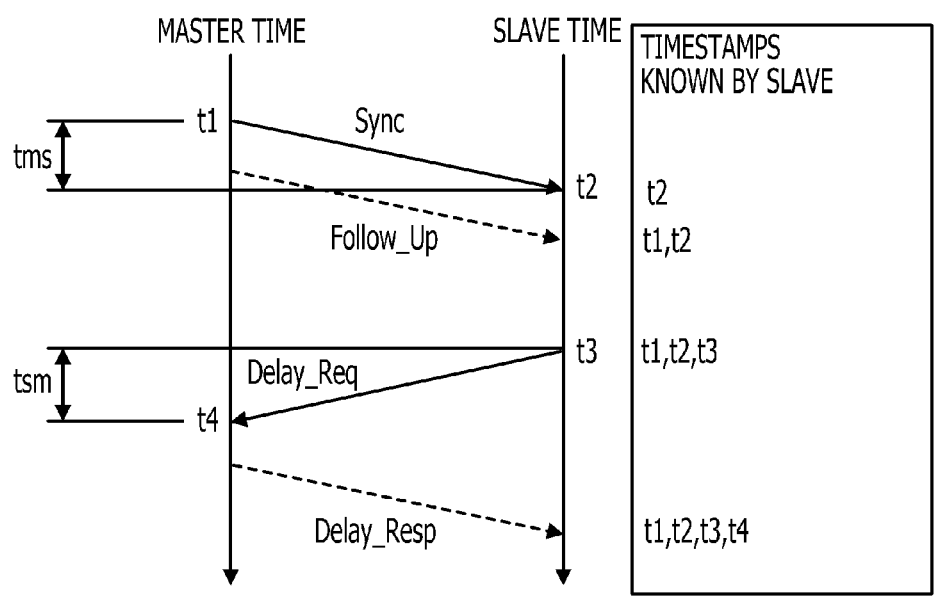
FIG. 1 illustrates an example of time synchronization according to PTP.
Figure 2:
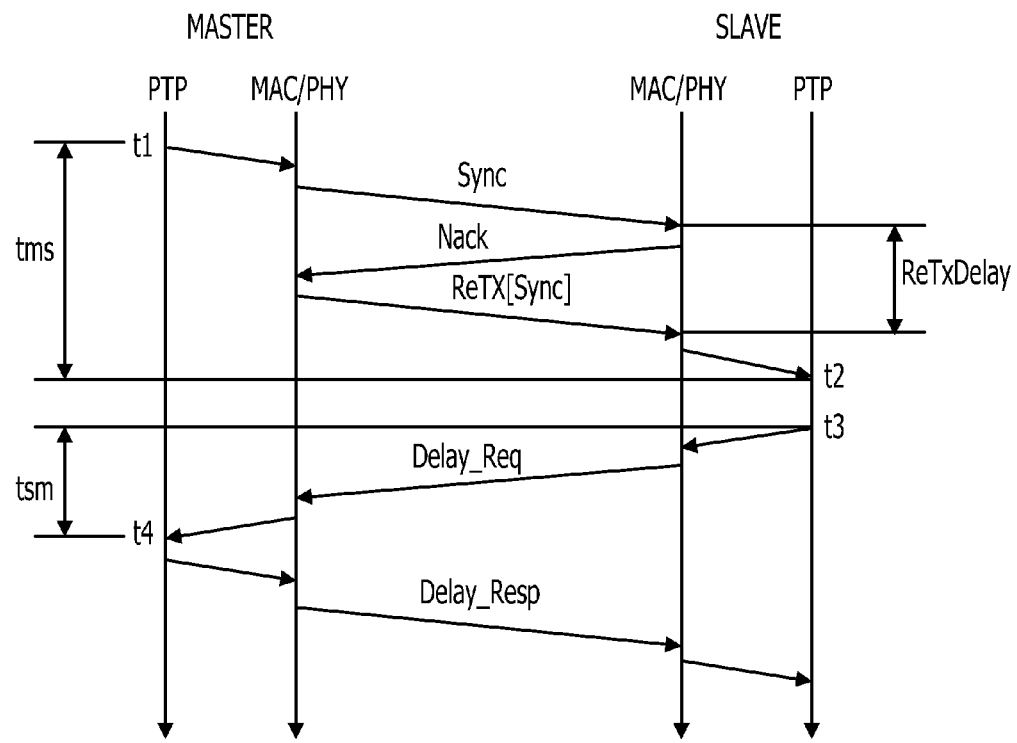
FIG. 2 illustrates an example of time synchronization performed when a message is retransmitted.

[1] Example of the Present Embodiment (1.1) Time Error Arising from a Delay in Communication Processing An example of time synchronization when a delay due to retransmitting of a message occurs as a delay in communication processing is illustrated in FIG. 2. Although time synchronization by PTP is illustrated as an example in FIG. 2, the protocol for time synchronization is not limited to PTP.

As illustrated in FIG. 2, retransmitting of the synchronization message from, for example, the master to the slave may be performed in a communication layer (a lower layer) such as the physical layer (PHY) or the media access control (MAC) layer. This communication layer is a layer below the time synchronization layer (an upper layer) in which time synchronization is performed.

In such a case, a delay (ReTxDelay (>0)) occurs, which depends on the number of retransmits from when the synchronization message is transmitted by the master to when the synchronization message is successfully received by the slave.

In the slave, however, the above delay (ReTxDelay) caused in the lower layer is not recognized in the upper layer that performs time synchronization. Accordingly, the upper layer of the slave performs time synchronization using the offset obtained through the following expression based on the transmitting time t1 of the synchronization message, the receiving time t2 of the synchronization message, the transmitting time t3 of the delay information request message, and the receiving time t4 of the delay information response message.

$$\text{Offset} = [tms - tsm]/2 = [(t2 - t1) - (t4 - t3)]/2$$

where the time t1, time t2, time t3, and time t4 meet the following expression: $0 < t1 < t4$ and $0 < t2 < t3$.

However, with consideration to the above delay (ReTxDelay), the correct offset is represented by the following expression (2).

$$\text{Offset} = [(tms - ReTx\text{Delay}) - tsm]/2 = [(t2 - ReTx\text{Delay} - t1) - (t4 - t3)]/2 \qquad (2)$$

Accordingly, the time error caused when the synchronization message is retransmitted once is ReTxDelay/2.

Although FIG. 2 illustrates an example in which the synchronization message is retransmitted once, there may be a case in which the synchronization message is retransmitted more than once, or a case in which another message such as the delay information request message (Delay_Req) is retransmitted once or more than once. In these cases, the above time error further increases.

There may be a case in which a delay due to adaptive modulation and coding (AMC) occurs as a delay in communication processing. For example, in a wireless system that uses AMC, the modulation method and code rate during transmitting of each message may vary depending on the wireless transmission environment. In such a case, a delay in communication processing, which causes the above time error, varies depending on the wireless transmission environment.

More specifically, for example, a case in which a modulation method of quadrature phase shift keying (QPSK) and a code rate of ½ are used is compared with a case in which a modulation method of 16 quadrature amplitude modulation (16QAM) and a code rate of ½ are used, assuming that information with the same size is transmitted along the same transmission path. In this example, the delay in communication processing for the case in which a modulation method of 16QAM is used is half the delay in communication processing for the case in which a modulation method of QPSK is used.

Therefore, in the example illustrated in FIG. 2, the lower layer reports information regarding a delay in communication processing of messages to the upper layer in which time synchronization is performed, and the upper layer performs time synchronization based on the information reported from the lower layer, so that time synchronization is performed at higher precision.

(1.2) Example of the Structure of a Communication System

Figure 3:
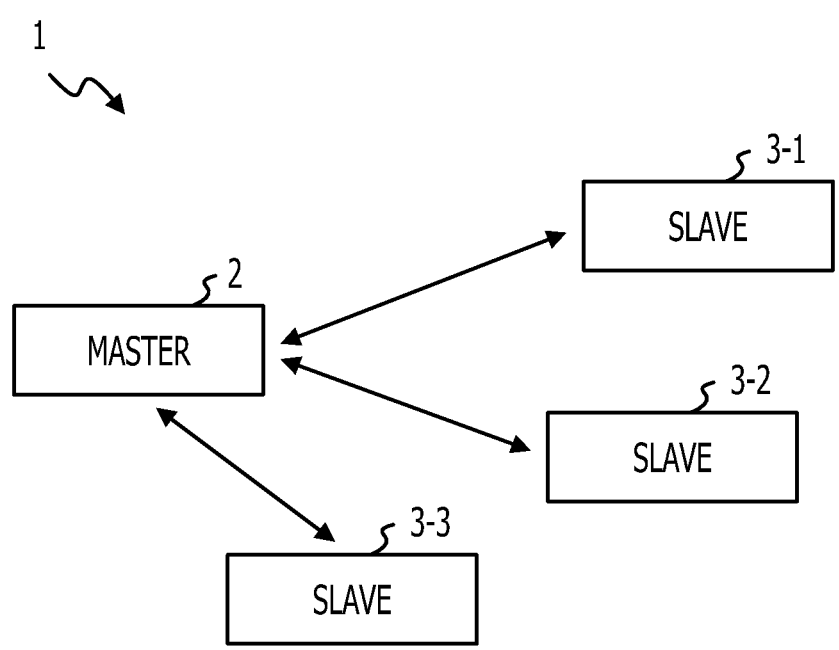
FIG. 3 illustrates an example of the structure of a communication system.

An example of the structure of the communication system in this example is illustrated in FIG. 3. A communication system 1 in FIG. 3 includes, for example, a master 2 and slaves 3-1, 3-2, and 3-3. When the slaves 3-1, 3-2, and 3-3 are not distinguished, they are simply referred to below as the slave 3. In addition, the number of slaves 3 is not limited to the number illustrated in FIG. 3.

The master 2 is a communication apparatus connected to the slave 3 either wirelessly or through a wire, and transmits various messages used for time synchronization to the slave 3 or receives various messages used for time synchronization from the slave 3.

In addition, the slave 3 is a communication apparatus connected to the master 2 either wirelessly or through a wire, and exchanges the various messages above with the master 2 to synchronize the time of the slave 3 with the time of the master 2.

The master 2 and the slave 3 may transmit or receive data other than the various messages above.

(1.3) Example of the Structure of the Master 2

Figure 4:
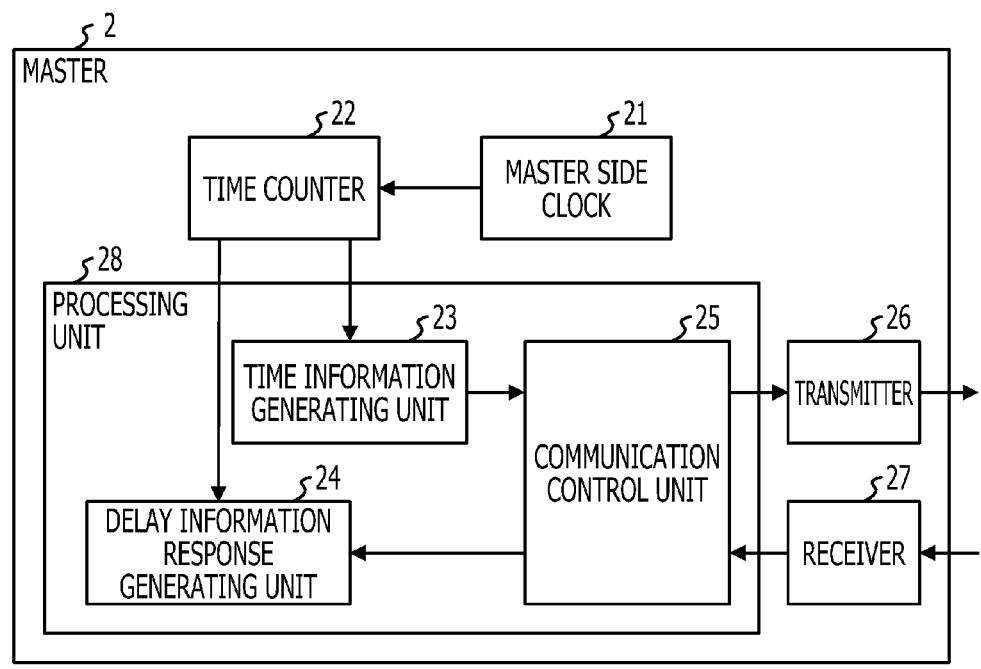
FIG. 4 illustrates an example of the structure of a master illustrated in FIG. 3.

An example of the structure of the master 2 is illustrated in FIG. 4. The master 2 in FIG. 4 includes, for example, a master side clock 21, a time counter 22, a transmitter 26, a receiver 27, and a processing unit 28.

The master side clock 21 generates a clock signal. The master side clock 21 includes an oscillation circuit having, for example, a quartz oscillator or atomic clock or so on.

The time counter 22 generates and outputs time information by counting the clock signal generated by the master side clock 21.

The processing unit 28 performs time synchronization using the synchronization message and delay information response message, which is described later. Accordingly, the processing unit 28 includes, for example, a time information generating unit 23, a delay information response generating unit 24, and a communication control unit 25.

The time information generating unit 23 generates the synchronization message (Sync), which is an example of time information for reporting the reference time, using time information output from the time counter 22 as reference time. The synchronization message includes the transmitting time of the synchronization message that is calculated based on the reference time. When a supplemental message (Follow_Up) is used to report the transmitting time of the synchronization message, the transmitting time of the synchronization message is included in the supplemental message.

The communication control unit 25 transmits, to the transmitter 26, the synchronization message generated by the time information generating unit 23 and the delay information response message (Delay_Resp) generated by the delay information response generating unit 24, which is described later, so that they are transmitted to the slave 3.

The communication control unit 25 may also perform retransmit control when the transmitted information is not successfully received by the slave 3. The retransmit control is made based on ACK (acknowledgement) and NACK (negative acknowledgement), which are feedback transmitted from the slave 3.

When the delay information request message (Delay_Req) transmitted from the slave 3 is successfully received by the receiver 27, ACK is transmitted to the slave 3. On the other hand, when the delay information request message from the slave 3 is not successfully received by the receiver 27, NACK may be transmitted to the slave 3.

The communication control unit 25 may calculate the time from when the delay information request message transmitted from the slave 3 is first received to when the retransmitted delay information request message is successfully received based on, for example, an identifier, contained in data transmitted from the slave 3, that indicates whether the data is new data that was transmitted for the first time or retransmitted data.

The communication control unit 25 may count the number of times the delay information request message is retransmitted from the slave 3 based on the above identifier and may calculate the above delay time based on the counting result and a processing delay caused for each retransmit.

In addition, the communication control unit 25 may calculate the delay time due to communication processing of the delay information request message based on, for example, information such as the modulation method or code rate of the delay information request message transmitted from the slave 3.

This enables the communication control unit 25 to calculate the delay time caused by communication processing performed in the lower layer.

In the following description, the retransmit status such as the number of retransmits and the delay time caused by retransmitting and the modulation method and code rate of data may be simply referred to as the reception status.

The communication control unit 25 reports the reception status of the delay information request message to the delay information response generating unit 24 and instructs it to generate the delay information response message.

If the modulation method and the code rate may be controlled in an adaptive manner in accordance with the propagation path environment in the communication path between the master 2 and the slave 3, the communication control unit 25 may properly set the modulation method and the code rate of the transmitter 26 and may transmit various types of information depending on the reception quality etc. measured by the receiver 27.

That is, the communication control unit 25 functions as an example of the communication processing unit that controls the communication processing of messages in the transmitter 26 and the receiver 27 in the communication layer that is the lower layer, and also outputs information regarding a delay in the communication processing.

The transmitter 26 transmits various types of information to the slave 3 according to an instruction from the communication control unit 25.

The receiver 27 receives a delay information request message transmitted from the slave 3, or receives, from the slave 3, an ACK or NACK indicating whether the slave 3 has successfully received various types of information transmitted from the master 2.

For example, when the master 2 and the slave 3 are coupled wirelessly, the transmitter 26 and the receiver 27 may be configured as individual or common antennas. In addition, for example, when the master 2 and the slave 3 are coupled through a wire, the transmitter 26 and the receiver 27 may be configured as connectors or wired interface devices appropriate for the transmission path.

The delay information response generating unit 24 obtains, from the time counter 22, the time when the delay information request message is received from the slave 3 as the time information t4, and obtains information (reception status information S1) on the reception status of the delay information request message from the communication control unit 25.

Then, the delay information response generating unit 24 subtracts, from the time t4 when the delay information request message is received from the slave 3, delays related to retransmitting and communication processing of the modulation method, the code rate or so on using, for example, the time information t4 and the reception status information S1 of the delay information request message. More specifically, the delay information response generating unit 24 obtains the corrected time t4' (t4'<t4) by subtracting delays related to communication processing with the following expression (3) from the time t4, generates a delay information response message that includes the corrected time t4', and transmits the delay information response message to the communication control unit 25.

$$t4'=t4-D1 \qquad (3)$$

In the above expression (3), D1 is a delay time that depends on the reception status information S1. For example, when the reception status information S1 is the number of retransmits, the delay information response generating unit 24 may use for D1 in the above correction a delay time ($D1_{rx}$), caused by retransmitting, that is calculated based on the number of retransmits. When the reception status information S1 is information about the modulation method or code rate, the delay information response generating unit 24 may use for D1 in the above correction a delay time ($D1_{mcs}$), calculated based on the modulation method or code rate, that due to communication processing of the delay information request message.

For example, if 100 bytes of information are transmitted in a transmission path with a transmission speed of 100 kbps when the modulation method is QPSK and the code rate is ½, then $D1_{mcs}$ is represented by the following expression (4).

$$D1_{mcs} = 100 \text{ Bytes} * 8/100 \text{ kbps} = 8 \text{ msec} \quad (4)$$

If 100 bytes of information is transmitted in a transmission path with a transmission speed of 100 kbps when the modulation method is 16QAM and the code rate is ½, then $D1_{mcs}$ is represented by the following expression (5).

$$D1_{mcs} = 100 \text{ Bytes} * 8/100 * 2 \text{ kbps} = 4 \text{ msec} \quad (5)$$

That is, the time information generating unit 23 and the delay information response generating unit 24 function as an example of the time synchronization unit that performs time synchronization with the slave 3 based on information regarding delays output from the communication control unit 25 in the time synchronization layer that is above the communication layer.

In the above example, the delay information response generating unit 24 corrects the time when the delay information request message was received from the slave 3 from t4 to t4'. However, for example, the reception status information S1 and the receiving time information t4 may be transmitted to the slave 3 with the reception status information S1 and the receiving time information t4 put in the delay information response message, and then the slave 3 may correct the time information t4 to t4' based on the reception status information S1.

Figure 5:
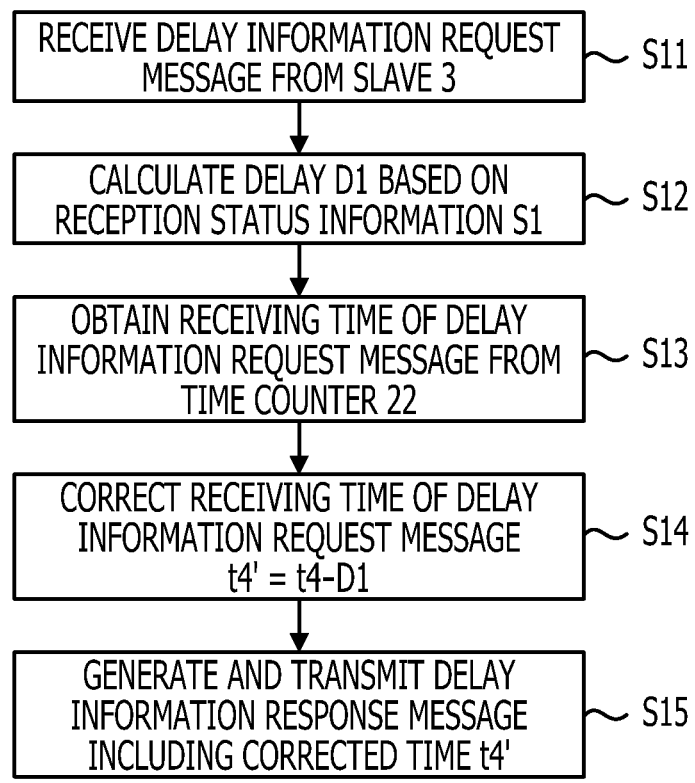
FIG. 5 is a flowchart illustrating an example of operation of the master.

An example of operation of the master 2 is described in FIG. 5. As illustrated in FIG. 5, first the receiver 27 receives a delay information request message from the slave 3 (step S11).

Next, the delay information response generating unit 24 obtains the reception status information S1 from the communication control unit 25 and calculates the delay time D1 based on the obtained reception status information S1 (step S12).

The delay information response generating unit 24 obtains, from the time counter 22, the receiving time t4 of the delay information request message (step S13) and corrects the receiving time t4 of the delay information request message to t4' (step S14).

Next, the delay information response generating unit 24 generates a delay information response message that includes the corrected time t4' and transmits it to the slave 3 (step S15).

As described above, the master 2 in this example may make a correction that subtracts, from the receiving time of the delay information request message transmitted from the slave 3, the delay time due to communication processing of the message, so that the delay information response message that includes the corrected time may be transmitted to the slave 3.

(1.4) Example of the Structure of the Slave 3

Figure 6:
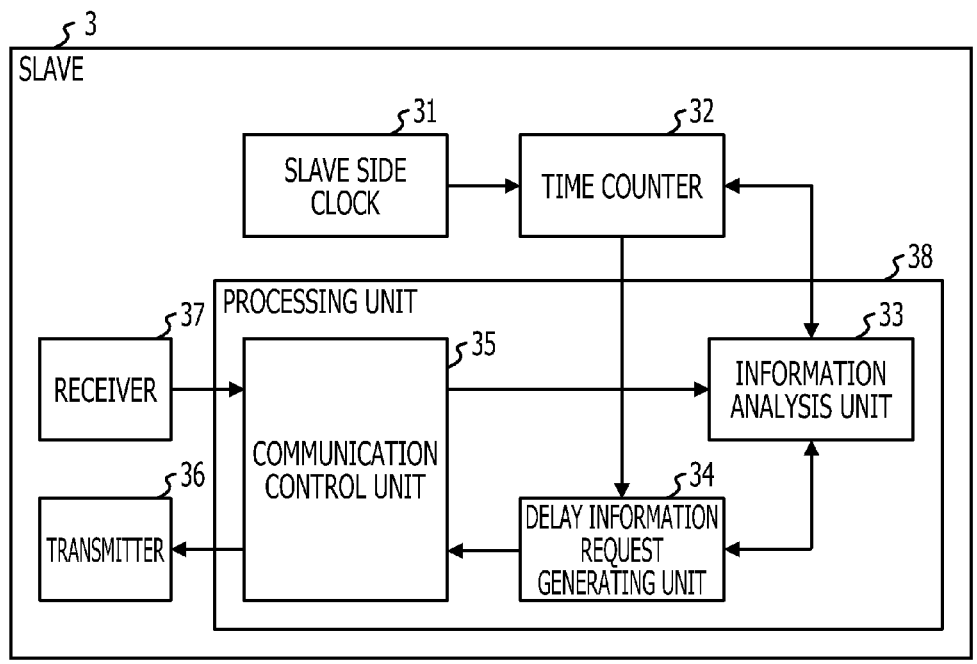
FIG. 6 illustrates an example of the structure of a slave illustrated in FIG. 3.

An example of the structure of the slave 3 is illustrated in FIG. 6. The slave 3 in FIG. 6 includes, for example, a slave side clock 31, a time counter 32, a transmitter 36, a receiver 37, and a processing unit 38.

The slave side clock 31 generates a clock signal. The slave side clock 31 includes an oscillation circuit having, for example, a quartz oscillator or atomic clock.

The time counter 32 counts the clock signal generated by the slave side clock 31.

The receiver 37 receives, from the master 2, a synchronization message that is an example of time information, a delay information response message, or an ACK or NACK, which indicate whether the master 2 has successfully received data transmitted from the slave 3.

The transmitter 36 transmits, to the master 2, a delay information request message or an ACK or NACK, which indicate whether data transmitted from the master 2 has been successfully received, according to an instruction by the communication control unit 35.

For example, when the master 2 and the slave 3 are coupled wirelessly, the transmitter 36 and the receiver 37 may be configured as individual or common antennas. For example, when the master 2 and the slave 3 are coupled through a wire, the transmitter 36 and the receiver 37 may be configured as connectors or wired interface devices appropriate for the transmission path.

The processing unit 38 performs time synchronization using the synchronization message, the delay information request message, and the delay information response message. Accordingly, the processing unit 38 includes, for example, an information analysis unit 33, a delay information request generating unit 34, and the communication control unit 35.

The communication control unit 35 transmits the delay information request message generated by the delay information request generating unit 34 to the transmitter 36 so that the message is transmitted to the master 2.

The communication control unit 35 performs retransmit control if the delay information request message that is transmitted to the master 2 is not successfully received by the master 2. This retransmit control is performed based on an ACK or NACK that the receiver 37 has received from the master 3.

When the synchronization message or the delay information response message that is transmitted from the master 2 is successfully received by the receiver 37, an ACK may be transmitted to the master 2. On the other hand, when the synchronization message or the delay information response message that is transmitted from the master 2 is not successfully received by the receiver 37, a NACK may be transmitted to the master 2.

In addition, the communication control unit 35 may calculate, for example, the time from when the synchronization message transmitted from the master 2 is first received to when the retransmitted synchronization message is correctly received based on the identifier that indicates whether data transmitted from the master 2 is new data that was transmitted for the first time or retransmitted data, with the identifier being included in the data.

For example, the communication control unit 35 may count the number of times the synchronization message is retransmitted from the master 2 based on the above identifier and may calculate the above delay time based on the counting result and a processing delay generated each time data is retransmitted.

In addition, the communication control unit 35 may also calculate the delay time due to the communication processing of the synchronization message based on, for example, information such as on the modulation method and the code rate of the synchronization message transmitted from the master 2.

As a result, the communication control unit 35 may be able to calculate the delay time caused by communication processing in a lower layer.

In addition, the communication control unit 35 notifies the information analysis unit 33 of the calculated delay time due to communication processing of the synchronization message and the reception status of the synchronization message.

If the modulation method and the code rate may be controlled in an adaptive manner depending on the propagation path environment in the communication path between the master 2 and the slave 3, the communication control unit 35 may properly set the modulation method and the code rate of the transmitter 36 and may transmit various types of information in accordance with information such as the reception quality measured by the receiver 37.

That is, the communication control unit 35 functions as an example of the communication processing unit that controls the communication processing of messages in the transmitter 36 and the receiver 37 in the communication layer that is the lower layer, and also outputs information regarding a delay in the communication processing.

The delay information request generating unit 34 generates a delay information request message according to an instruction by the information analysis unit 33 and transfers the generated message to the communication control unit 35 so that the message is transmitted to the master 2. The delay information request generating unit 34 also obtains the generation time t3 of the delay information request message from the time counter 32 and reports the obtained time t3 to the information analysis unit 33.

The information analysis unit 33 obtains, from the communication control unit 35, the time information t1, which is transmitted from the master 2, and reception status information S2 about the status when the time information t1 is received, and obtains the time t2 (t2<t3), which is when the time information t1 is received from the time counter 32.

When receiving time information from the master 2, the information analysis unit 33 instructs the delay information request generating unit 34 to transmit the delay information request message to the master 2 and receives notification of the transmitting time t3 of the delay information request message from the time counter 32.

When receiving the delay information response message from the master 2, the information analysis unit 33 obtains, from the delay information response message, the time t4 when the delay information request message was received by the master 2.

Then, the information analysis unit 33 subtracts, from the time t2 that is when the synchronization message is received from the master 2, delays related to retransmitting and communication processing for the modulation method, the code rate or so on using, for example, the time information t2 and the reception status information S2. More specifically, for example, the information analysis unit 33 obtains the corrected time t2' (t2'<t2) by subtracting the delay related to communication processing from time t2 using the following expression (6).

$$t2'=t2-D2 \quad (6)$$

In the above expression (6), D2 is a delay time that is determined in accordance with the reception status information S2. For example, when the reception status information S2 is the number of retransmits, the information analysis unit 33 may use for D2 in the above correction a delay time ($D2_{rx}$), caused by retransmitting, that is calculated based on the number of retransmits. When the reception status information S2 is information regarding the modulation method or code rate, the information analysis unit 33 may use for D2 in the above correction a delay time ($D2_{mcs}$), calculated based on the modulation method or code rate, that is due to communication processing of the delay information request message.

For example, if 100 bytes of information are transmitted in a transmission path with a transmission speed of 100 kbps when the modulation method is QPSK and the code rate is ½, then $D2_{mcs}$ is represented by the following expression (7).

$$D2_{mcs}=100 \text{ Bytes}*8/100 \text{ kbps}=8 \text{ msec} \quad (7)$$

If 100 bytes of information are transmitted in a transmission path with a transmission speed of 100 kbps when the modulation method is 16QAM and the code rate is ½, then $D2_{mcs}$ is represented by the following expression (8).

$$D2_{mcs}=100 \text{ Bytes}*8/100*2 \text{ kbps}=4 \text{ msec} \quad (8)$$

When a delay information response message (t4) is received from the master 2, the information analysis unit 33 calculates the difference (offset) between the time of the master 2 and the time of the slave 3 using the following expression (9) and corrects the time counter 32 using the calculated offset.

$$\text{Offset}=\{(t2'-t1)-(t4'-t3)\}/2=\{(t2-D2-t1)-(t4-D1-t3)\}/2 \quad (9)$$

The information analysis unit 33 and the delay information request generating unit 34 function as an example of the time synchronization unit that performs time synchronization with the master 2 based on information about delays output from the communication control unit 35 in the time synchronization layer that is above the communication layer.

Figure 7:
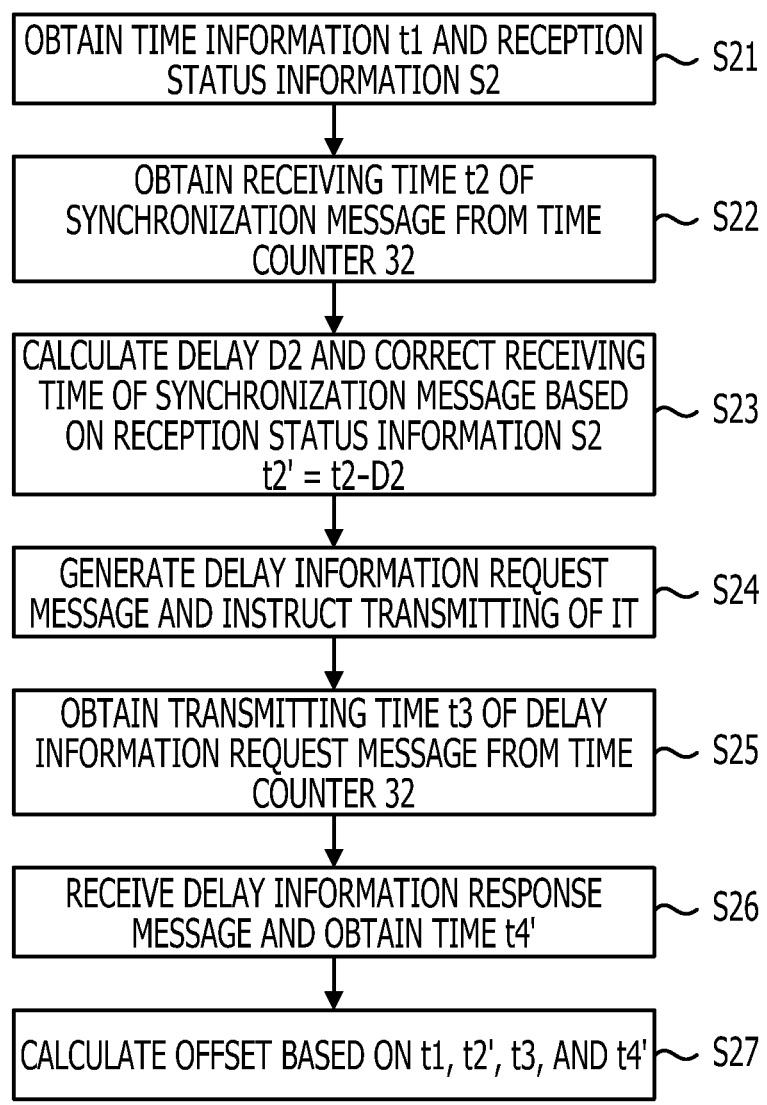
FIG. 7 is a flowchart illustrating an example of operation of the slave.

An example of operation of the slave 3 is described in FIG. 7.

As illustrated in FIG. 7, firstly, the receiver 37, the communication control unit 35, and the information analysis unit 33 obtain the time information t1 and the reception status information S2 (step S21).

Next, the information analysis unit 33 obtains, from the time counter 32, the receiving time t2 of the synchronization message (step S22) and corrects the time t2 to t2' based on the reception status information S2 (step S23).

Then, the information analysis unit 33 and the delay information request generating unit 34 generate a delay information request message and instruct the communication control unit 35 and the transmitter 36 to transmit the delay information request message (step S24).

The information analysis unit 33 obtains, from the time counter 32, the transmitting time t3 of the delay information request message (step S25).

The receiver 37, the communication control unit 35, and the information analysis unit 33 receive the delay information response message from the master 2 and obtain the time t4' (step S26).

Then, the information analysis unit 33 calculates the offset based on the time t1, the time t2', the time t3, and the time t4' (step S27).

As described above, the slave 3 in this example makes a correction by subtracting the delay time due to communication processing of the synchronization message transmitted from the master 2 from the receiving time of the synchronization message, so that the offset may be calculated based on the corrected time.

Since the slave 3 may perform synchronization with the time of the master 2 by correcting the time of the slave 3 using the calculated offset above, the slave 3 may perform time synchronization at higher precision.

Figure 8:
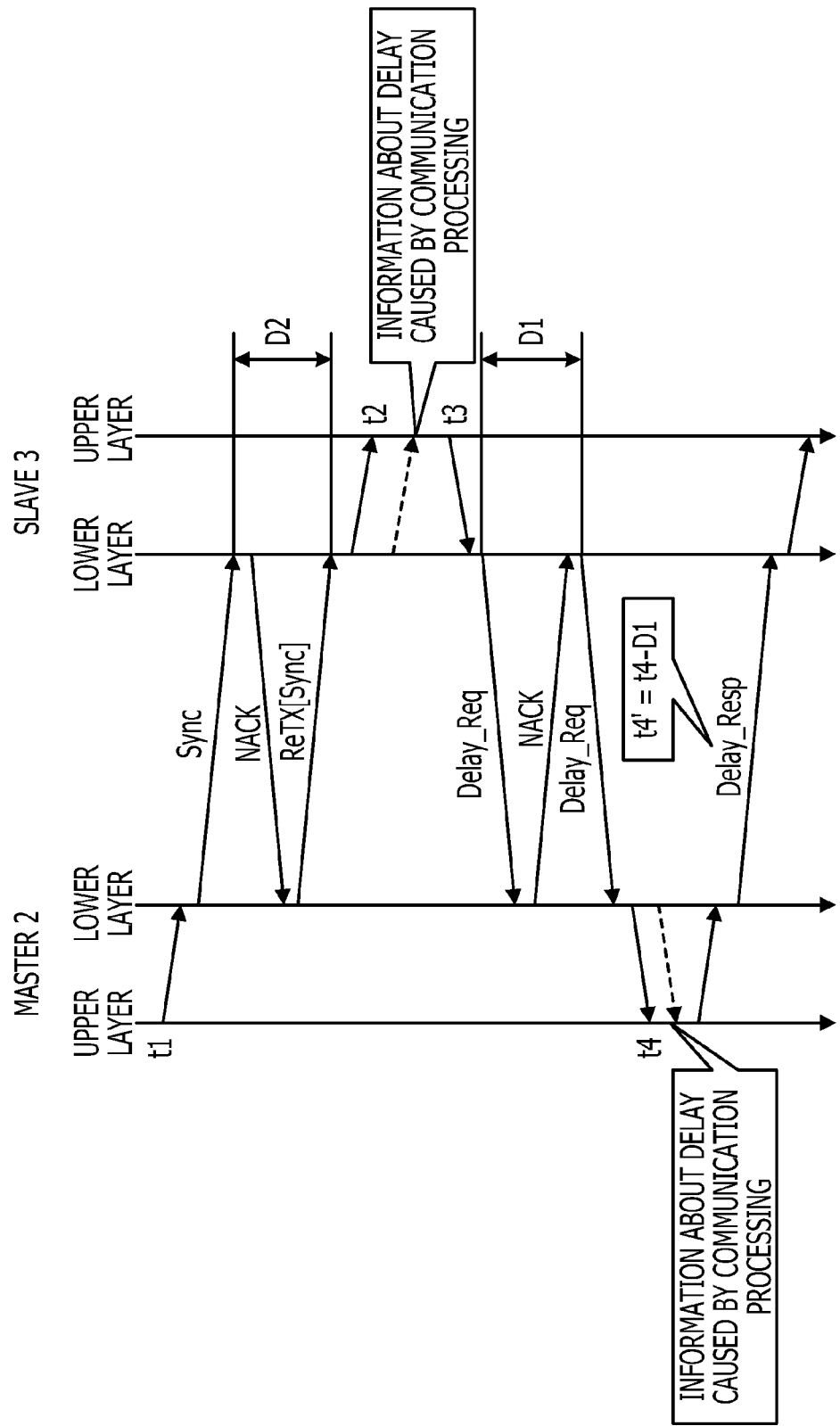
FIG. 8 illustrates an example of the message sequence of the communication system.

An example of operation of the above communication system 1 is illustrated in FIG. 8.

As illustrated in FIG. 8, information regarding a communication processing delay of the synchronization message is reported from a lower layer of the slave 3 to an upper layer of the slave 3 and a correction from the time t2 to t2' is made in the upper layer.

Information regarding a delay in communication processing of the delay information request message is reported from a lower layer of the master 2 to an upper layer of the master 2 and, in this upper layer, a correction from the time t4 to t4' is made. Then, the delay information request message that includes the corrected time t4' is transmitted from the master 2 to the slave 3.

In the example described above, the receiving side of messages corrects the receiving times of the messages based on a delay caused by communication processing of the messages, so that the precision of time synchronization may be improved.

[2] Other Examples of this Embodiment

The receiving side of messages performs a correction in the example above, but the transmitting side of messages may perform the same correction.

Examples of the structure and operation of a master 2A, which is a modification of the master 2, and a slave 3A, which is a modification of the slave 3A, are described below.

(2.1) Example of the Structure of the Master 2a

Figure 9:
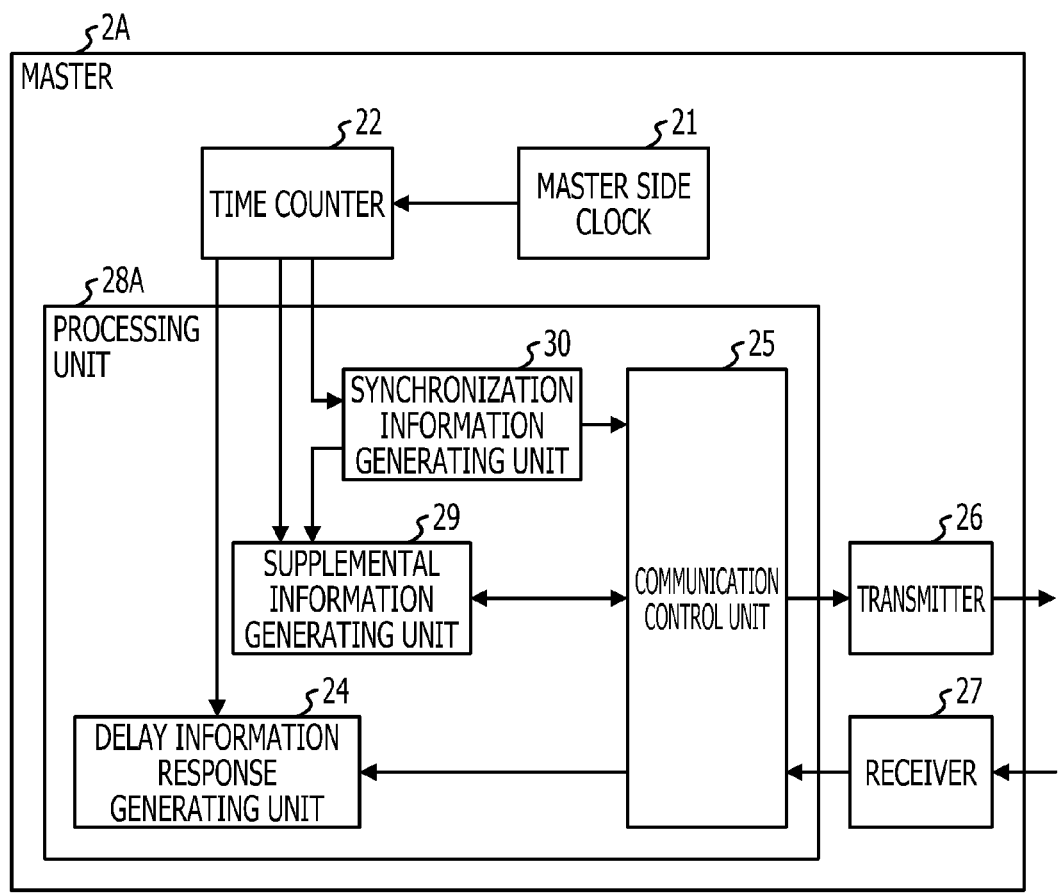
FIG. 9 illustrates another example of the structure of the master.

An example of the structure of the master 2A is illustrated in FIG. 9.

The master 2A in FIG. 9 includes, for example, the master side clock 21, the time counter 22, the transmitter 26, the receiver 27, and a processing unit 28A.

The master side clock 21 generates a clock signal. The master side clock 21 includes, for example, an oscillation circuit having, for example, a quartz oscillator or atomic clock.

The time counter 22 counts the clock signal generated by the master side clock 21.

The processing unit 28A performs time synchronization using the synchronization message, the supplemental message, and the delay information response message. Accordingly, the processing unit 28A includes, for example, a synchronization information generating unit 30, a supplemental information generating unit 29, the delay information response generating unit 24, and the communication control unit 25.

The synchronization information generating unit 30 generates a synchronization message, which is an example of time information, based on the reference time obtained from the counting result by the time counter 22.

In addition, the supplemental information generating unit 29 obtains the transmitting time of the synchronization message generated by the synchronization information generating unit 30 from the time counter 22 and generates a supplemental message that includes the obtained transmitting time. When using a supplemental message, the synchronization message may be a message that doesn't include the transmitting time of the synchronization message.

The communication control unit 25 transmits, to the transmitter 26, the synchronization message generated by the synchronization information generating unit 30, the supplemental message generated by the supplemental information generating unit 29, and the delay information response message generated by the delay information response generating unit 24, so that they are transmitted to the slave 3A.

The communication control unit 25 may also perform retransmit control when the transmitted information is not successfully received by the slave 3A. The retransmit control is made based on an ACK or NACK, which are feedback transmitted from the slave 3A.

When the delay information request message transmitted from the slave 3A is successfully received by the receiver 27, an ACK is transmitted to the slave 3A. On the other hand, when the delay information request message from the slave 3A is not successfully received by the receiver 27, a NACK may be transmitted to the slave 3A.

The communication control unit 25 may calculate the time from when the synchronization message is first transmitted to when the synchronization message that is successfully received by the slave 3A is transmitted.

Alternatively, the communication control unit 25 may count the number of times the synchronization message is retransmitted and the number of times a NACK is received from the slave 3A and may calculate the above delay time based on the counting results and a processing delay caused by each retransmit.

In addition, the communication control unit 25 may calculate the delay time due to communication processing of the synchronization message based on, for example, information such as on the modulation method or code rate of the synchronization message.

As a result, the communication control unit 25 may be able to calculate the delay time caused by communication processing performed in the lower layer.

Here, both the retransmit status such as the number of retransmits and the delay time caused by retransmitting as well as the modulation method and code rate of data may be simply referred to as the reception status.

The communication control unit 25 reports the reception status of the synchronization message to the supplemental information generating unit 29 and instructs the supplemental information gathering unit 29 to generate the supplemental message.

If the modulation method and the code rate may be controlled in an adaptive manner depending on the propagation path environment in the communication path between the master 2A and the slave 3A, the communication control unit 25 may appropriately set the modulation method and the code rate of the transmitter 26 and may transmit various types of information depending on the reception quality and so on measured by the receiver 27.

That is, the communication control unit 25 functions as an example of a communication processing unit that controls the communication processing of messages in the transmitter 26 and the receiver 27 in the communication layer, which is a lower layer, and outputs information regarding a delay in the communication processing.

The transmitter 26 transmits various types of information to the slave 3A according to an instruction by the communication control unit 25.

The receiver 27 receives the delay information request message transmitted from the slave 3A or receives, from the slave 3A, an ACK or NACK indicating whether the slave 3A has successfully received various types of information transmitted from the master 2A.

For example, when the master 2A and the slave 3A are coupled wirelessly, the transmitter 26 and the receiver 27 may be configured as individual or common antennas. In addition, for example, when the master 2A and the slave 3A are coupled through a wire, the transmitter 26 and the receiver 27 may be configured as connectors or wired interface devices appropriate for the transmission path.

The delay information response generating unit 24 obtains, from the time counter 22, the time when the delay information request message is received from the slave 3A, as the time information t4.

At this time, for example, the supplemental information generating unit 29 obtains information (reception status information S3) about the reception status of the synchronization message from the communication control unit 25.

Then, the supplemental information generating unit 29 adds, to the time information t1 included in the supplemental message, delays related to retransmitting and communication processing of the modulation method or the code rate or so on, using the time information t1 and the reception status information S3 of the synchronization message. More specifically, for example, the supplemental information generating unit 29 obtains the corrected time t1' (t1<t1') by adding the delay related to communication processing with the following expression (10) to the time t1, generates a supplemental message that includes the corrected time t1', and transmits it to the communication control unit 25.

$$t1'=t1+D3 \qquad (10)$$

In the above expression (10), D3 is a delay time that is determined in accordance with the reception status information S3. For example, when the reception status information S3 is the number of retransmits, the supplemental information generating unit 29 may use for D3 in the above correction a delay time ($D3_{rx}$), caused by retransmitting, that is calculated based on the number of retransmits. When the reception status information S3 is information regarding the modulation method or code rate, the supplemental information generating unit 29 may use for D3 in the above correction a delay time ($D3_{mcs}$), calculated based on the modulation method or code rate, due to communication processing of the synchronization message.

For example, if 100 bytes of information is transmitted in a transmission path with a transmission speed of 100 kbps when the modulation method is QPSK and the code rate is ½, then $D3_{mcs}$ is represented by the following expression (11).

$$D3_{mcs}=100\ Bytes*8/100\ kbps=8\ msec \qquad (11)$$

If 100 bytes of information is transmitted in a transmission path with a transmission speed of 100 kbps when the modulation method is 16QAM and the code rate is ½, then $D3_{mcs}$ is represented by the following expression (12)

$$D3_{mcs}=100\ Bytes*8/100*2\ kbps=4\ msec \qquad (12)$$

That is, the synchronization information generating unit 30, the supplemental information generating unit 29, and the delay information response generating unit 24 function as an example of a time synchronization unit that performs time synchronization with the slave 3A based on information regarding delays output from the communication control unit 25 in the time synchronization layer above the communication layer.

In the above example, the supplemental information generating unit 29 changes the transmitting time t1 of the synchronization message to t1'. However, for example, the reception status information S3 and the receiving time information t1 may be transmitted to the slave 3A with the information put in the supplemental message and then the slave 3A may correct the time information t1 to t1' based on the reception status information S3.

Figure 10:
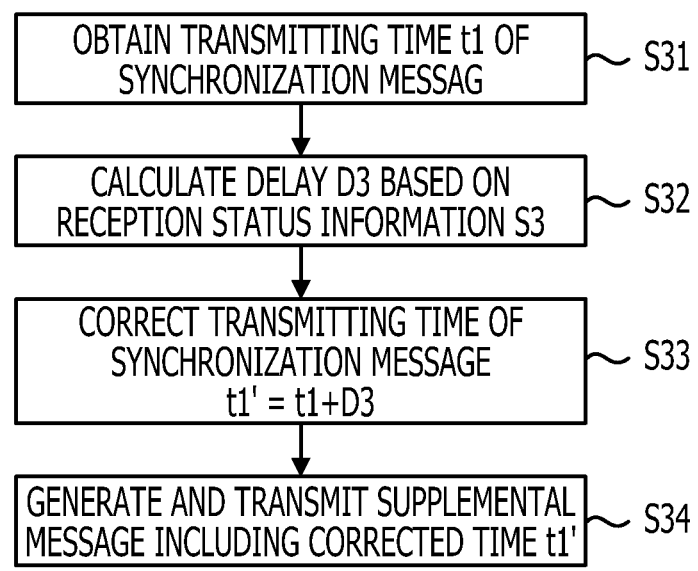
FIG. 10 is a flowchart illustrating an example of operation of the master illustrated in FIG. 9.

An example of operation of the master 2A is described in FIG. 10. As illustrated in FIG. 10, the supplemental information generating unit 29 obtains the transmitting time t1 of the synchronization message from the time counter 22 (step S31).

Next, the supplemental information generating unit 29 obtains the reception status information S3 from the communication control unit 25 and calculates a delay time D3 based on the obtained reception status information S3 (step S32).

Then, the supplemental information generating unit 29 corrects the time t1 of the synchronization message to t1' based on the calculated delay time D3 (step S33).

Next, the supplemental information generating unit 29 generates a supplemental message that includes the corrected time t1' and transmits it to the slave 3A (step S34).

As described above, the master 2A in this example makes a correction by adding the delay time due to communication processing of the synchronization message to be transmitted to the slave 3A from the first transmitting time of the synchronization message, so that the supplemental message that includes the corrected time may be transmitted to the slave 3A.

(2.2) Example of the Structure of the Slave 3A

Figure 11:
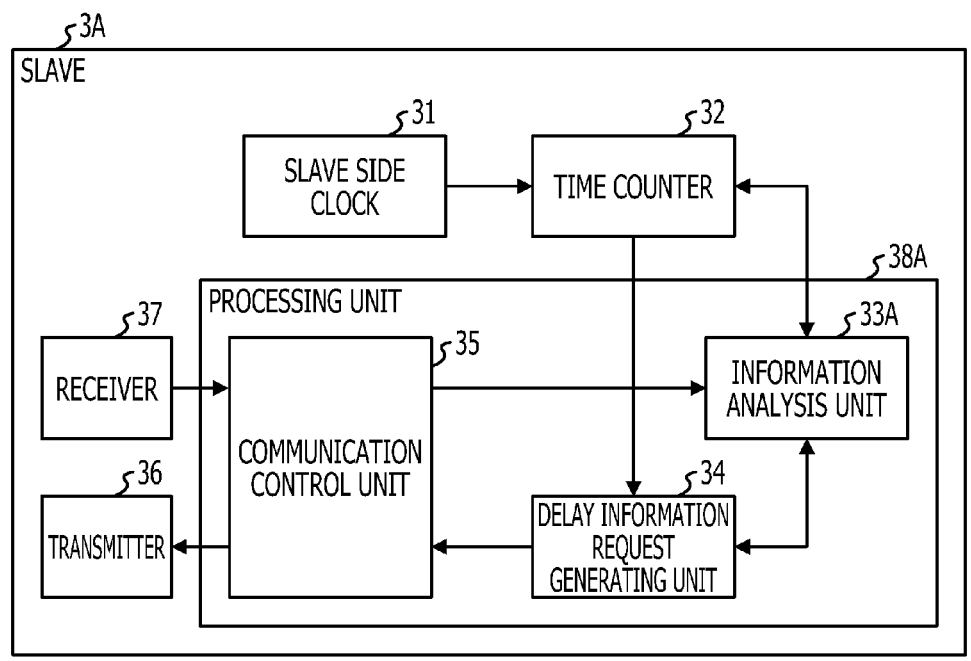
FIG. 11 illustrates another example of the structure of the slave.

An example of the structure of the slave 3A is illustrated in FIG. 11. The slave 3A in FIG. 11 includes, for example, the slave side clock 31, the time counter 32, the transmitter 36, the receiver 37, and a processing unit 38A.

The slave side clock 31 generates a clock signal. The slave side clock 31 includes an oscillation circuit having, for example, a quartz oscillator or atomic clock.

The time counter 32 counts the clock signal generated by the slave side clock 31.

The receiver 37 receives, from the master 2A, a synchronization message, a supplemental message, or a delay information response message transmitted from the master 2A, or an ACK or NACK, which indicate whether the master 2A has successfully received data transmitted from the slave 3A.

The transmitter 36 transmits, to the master 2A, a delay information request message or an ACK or NACK, which indicate whether data transmitted from the master 2A has been successfully received, according to an instruction by a communication control unit 35.

For example, when the master 2A and the slave 3A are coupled wirelessly, the transmitter 36 and the receiver 37 may be configured as individual or common antennas. For example, when the master 2A and the slave 3A are coupled through a wire, the transmitter 36 and the receiver 37 may be configured as connectors or wired interface devices appropriate for the transmission path.

The processing unit 38A performs time synchronization using the synchronization message, supplemental message, delay information request message, and the delay information response message. Accordingly, the processing unit 38A, for example, includes an information analysis unit 33A, the delay information request generating unit 34, and the communication control unit 35.

The communication control unit 35 transmits the delay information request message generated by the delay information request generating unit 34 to the transmitter 36 so that this message is transmitted to the master 2A.

The communication control unit 35 performs retransmit control if the delay information request message that has been transmitted to the master 2A is not successfully received by the master 2A. This retransmit control is performed based on an ACK or NACK that the receiver 37 receives from the master 2A.

When the synchronization message, supplemental message, or delay information response message that has been transmitted from the master 2A is successfully received by the receiver 37, an ACK may be transmitted to the master 2A.

On the other hand, when the synchronization message, supplemental message, or delay information response message that has been transmitted from the master 2A is not successfully received by the receiver 37, a NACK may be transmitted to the master 2A.

In addition, the communication control unit 35 may calculate, for example, the time from when the delay information request message is first transmitted to when the delay information request message successfully received by the master 2A is transmitted.

Alternatively, the communication control unit 35 may count the number of times the delay information request message is retransmitted and the number of times a NACK is received from the master 2A, and may calculate the above delay time based on the counting results and a processing delay caused for each retransmit.

In addition, the communication control unit 35 may calculate the delay time due to communication processing of the delay information request message based on information such as on the modulation method or code rate of the delay information request message.

This enables the communication control unit 35 to calculate the delay time caused by communication processing performed in the lower layer.

In addition, the communication control unit 35 reports both the calculated delay time due to communication processing of the delay information request message and the reception status of the delay information request message to the information analysis unit 33A.

If the modulation method and the code rate may be controlled in an adaptive manner depending on the propagation path environment in the communication path between the master 2A and the slave 3A, the communication control unit 35 may properly set the modulation method and the code rate of the transmitter 36 and may transmit various types of information depending on the reception quality and so on measured by the receiver 37.

That is, the communication control unit 35 functions as an example of a communication processing unit that controls the communication processing of messages in the transmitter 36 and the receiver 37 in the communication layer as a lower layer, and also outputs information about a delay in the communication processing.

The delay information request generating unit 34 generates a delay information request message according to an instruction by the information analysis unit 33A and transfers the generated message to the communication control unit 35 so that the message is transmitted to the master 2A. The delay information request generating unit 34A also obtains the time t3 when the delay information request message is generated from the time counter 32 and reports the obtained time t3 to the information analysis unit 33A.

The information analysis unit 33A obtains, from the communication control unit 35, the time information t1' that is included in the supplemental message transmitted from the master 2A and reception status information S4 that is obtained when the time information t1' is received, and obtains the time t2 (t2<t3) that is the time when the time information t1' is received, from the time counter 32.

When receiving the supplemental message from the master 2A, the information analysis unit 33A instructs the delay information request generating unit 34 to transmit the delay information request message to the master 2A and receives a notification of the transmitting time t3 of the delay information request message from the time counter 32.

When a delay information response message is received from the master 2A, the information analysis unit 33A obtains, from the delay information response message, the time t4 when the delay information request message was received by the master 2A.

Then, the information analysis unit 33A adds, to the time t3 when the delay information request message has been first transmitted, delays related to retransmitting and communication processing of the modulation method or the code rate or so on using, for example, the time information t3 and the reception status information S4 of the delay information request message. More specifically, for example, the information analysis unit 33A obtains the corrected time t3' (t3<t3') by adding delay related to communication processing to the time t3 using the following expression (13).

$$t3'=t3+D4 \quad (13)$$

In the above expression (13), D4 is a delay time that is determined in accordance with the reception status information S4. For example, when the reception status information S4 is the number of retransmits, the information analysis unit 33A may use for D4 in the above correction a delay time ($D4_{rx}$), caused by retransmitting, that is calculated based on the number of retransmits. When the reception status information S4 is information about the modulation method or code rate, the information analysis unit 33A may use for D4 in the above correction a delay time ($D4_{mcs}$), calculated based on the modulation method or code rate, that is due to communication processing of the delay information request message.

For example, if 100 bytes of information is transmitted in a transmission path with a transmission speed of 100 kbps when the modulation method is QPSK and the code rate is ½, then $D4_{mcs}$ is represented by the following expression (14).

$$D4_{mcs}=100 \text{ Bytes}*8/100 \text{ kbps}=8 \text{ msec} \quad (14)$$

If 100 bytes of information is transmitted in a transmission path with a transmission speed of 100 kbps when the modulation method is 16QAM and the code rate is ½, then $D4_{mcs}$ is represented by the following expression (15)

$$D4_{mcs}=100 \text{ Bytes}*8/100*2 \text{ kbps}=4 \text{ msec} \quad (15)$$

When receiving a delay information response message (t4) from the master 2A, the information analysis unit 33A calculates the difference (offset) between the time of the master 2A and the time of the slave 3A using the following expression (16) and corrects the time counter 32 using the calculated offset.

$$\text{Offset}=\{(t2-t1')-(t4-t3')\}/2=\{(t2-t1-D3)-(t4-t3-D4)\}/2 \quad (16)$$

The information analysis unit 33A and the delay information request generating unit 34 function as an example of the time synchronization unit that performs time synchronization with the master 2A based on information regarding delays output from the communication control unit 35 in the time synchronization layer that is above the communication layer.

Figure 12:
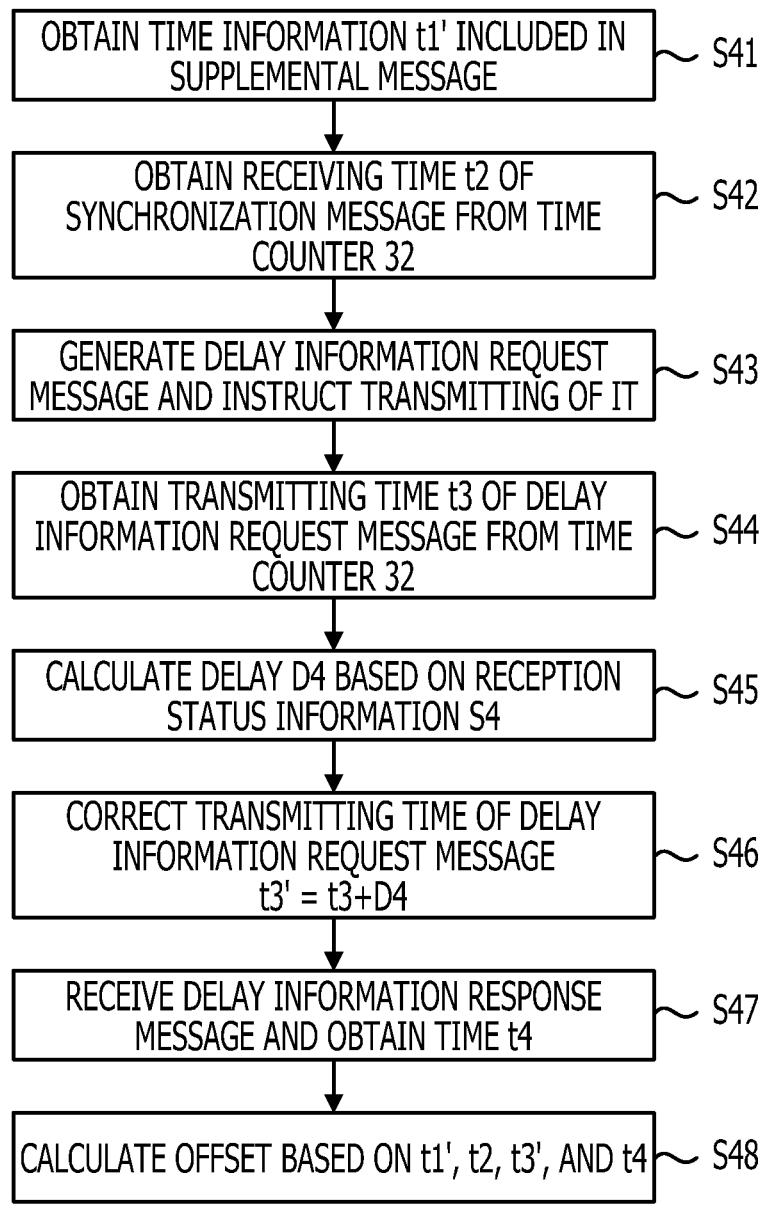
FIG. 12 is a flowchart illustrating an example of operation of the slave illustrated in FIG. 11.

An example of operation of the slave 3A is described in FIG. 12. As illustrated in FIG. 12, first, the receiver 37, the communication control unit 35, and the information analysis unit 33A obtain the time information t1' that is included in the supplemental message transmitted from the master 2A (step S41).

Next, the information analysis unit 33A obtains, from the time counter 32, the receiving time t2 of the synchronization message (step S42).

Then, the information analysis unit 33A and the delay information request generating unit 34 generate a delay information request message, and instruct the communication control unit 35 and the transmitter 36 to transmit the delay information request message (step S43).

In addition, the information analysis unit 33A obtains, from the time counter 32, the transmitting time t3 of the delay information request message (step S44).

In addition, the information analysis unit 33A obtains the reception status information S4 from the communication control unit 35 and calculates the delay time D4 based on the obtained reception status information S4 (step S45).

Then, the information analysis unit 33A corrects the transmitting time t3 of the delay information request message to the time t3' based on the calculated delay time D4 (step S46).

In addition, the receiver 37, the communication control unit 35, and the information analysis unit 33A receive the delay information response message from the master 2A and obtain the time t4 (step S47).

Then, the information analysis unit 33A calculates the offset based on the time t1', the time t2, the time t3', and the time t4 (step S48).

As described above, the slave 3A in this example makes a correction that subtracts the delay time due to communication processing of the delay information request message to be transmitted to the master 2A from the first transmitting time of the message, so that the offset may be calculated based on the corrected time.

Since the slave 3A may synchronize with the time of the master 2A by correcting the time of the slave 3A using the offset calculated above, the slave 3A may perform time synchronization at higher precision.

Figure 13:
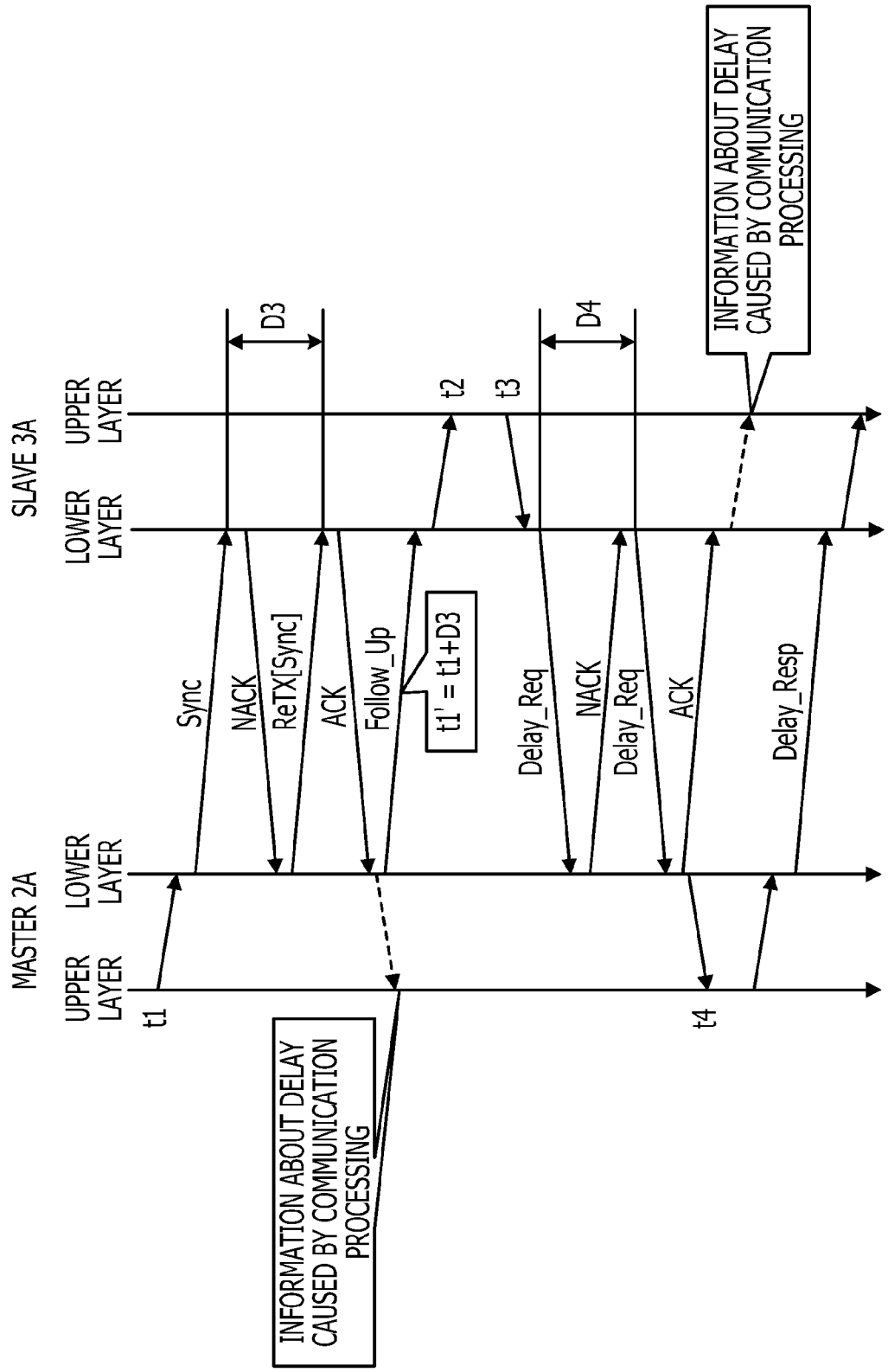
FIG. 13 illustrates another example of the message sequence of the communication system.

An example of operation of the above communication system 1 is illustrated in FIG. 13. As illustrated in FIG. 13, information regarding a delay in communication processing of the synchronization message is reported from a lower layer of the master 2A to an upper layer of the master 2A and, in this upper layer, a correction from the time t1 to t1' is made. Then, a supplemental message that includes the corrected time t1' is transmitted from the master 2A to the slave 3A.

In addition, information regarding a delay in communication processing of the delay information request message is reported from a lower layer of the slave 3A to an upper layer of the slave 3A and, in the upper layer of the slave 3A, a correction from the time t3 to t3' is made.

In the example described above, the transmitting side of messages corrects the transmitting times of the messages based on a delay caused by communication processing of the messages, so that the precision of time synchronization may be improved.

In the communication system 1, the above correction of time information by the receiving side and the above correction of time information by the transmitting side may be combined.

[3] Example of the Hardware Structure

Figure 14:
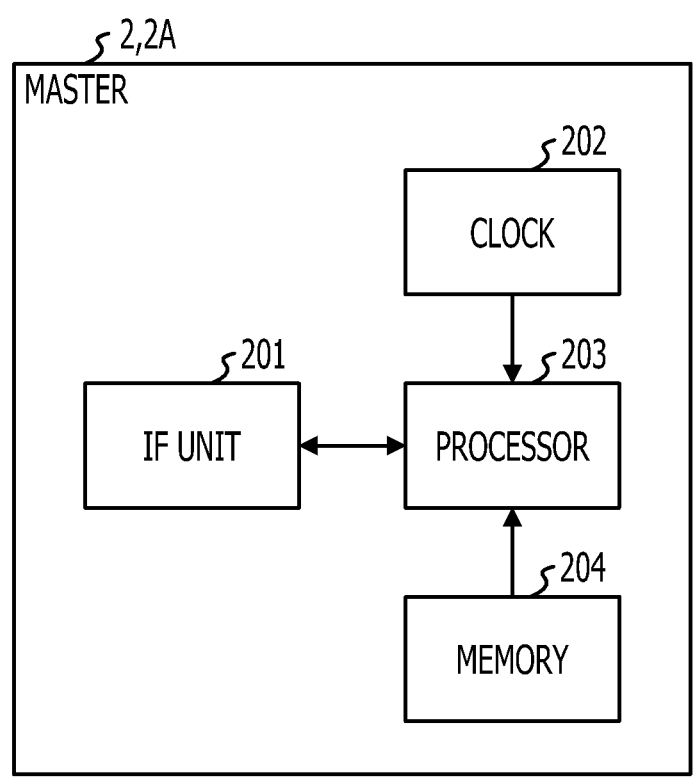
FIG. 14 illustrates an example of the hardware structure of the master.

FIG. 14 illustrates an example of the hardware structure of the masters 2 and 2A.

An interface (IF) unit 201 is an interface unit for communicating with the slaves 3 and 3A, and includes a wireless or wired interfaces. A clock 202 is a unit for counting time and includes devices such as a quartz oscillator or atomic clock. A processor 203 is a data processing unit and includes, for example, a CPU (central processing unit) or a DSP (digital signal processor). A memory 204 is a data storage unit and includes, for example, a ROM (read-only memory) and a RAM (random access memory).

As an example, the correspondence between the structures of the master 2 illustrated in FIG. 4 and the master 2A illustrated in FIG. 9 and the structure of the masters 2 and 2A illustrated in FIG. 14 is described below.

The clock 202 corresponds to, for example, the master side clock 21. The IF unit 201 corresponds to, for example, the transmitter 26 and the receiver 27. The processor 203 and the memory 204 correspond to, for example, the time counter 22, the time information generating unit 23, the delay information response generating unit 24, the communication control unit 25, the synchronization information generating unit 30, the supplemental information generating unit 29, and the processing units 28 and 28A.

Figure 15:
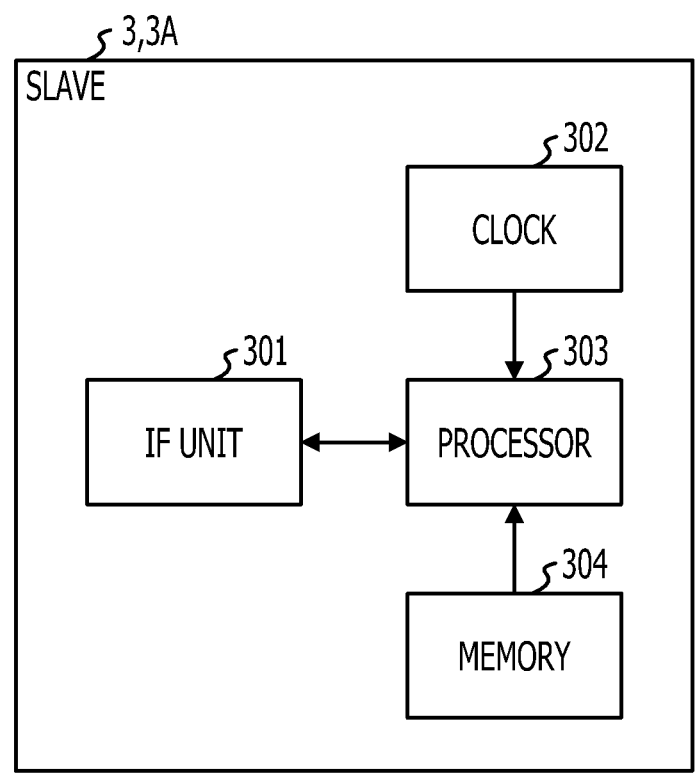
FIG. 15 illustrates an example of the hardware structure of the slave.

FIG. 15 illustrates an example of the hardware structure of the slaves 3 and 3A.

An IF unit 301 is an interface device for communicating with the masters 2 and 2A and includes a wireless or wired interfaces. A clock 302 is a unit for counting time and includes a device such as a quartz oscillator or atomic clock. A processor 303 is a data processing device and includes, for example, a CPU or DSP. A memory 304 is a data storage device and includes, for example, a ROM or a RAM.

As an example, the correspondence between structure of the slave 3 in FIG. 6 and the slave 3A in FIG. 11 and the structure in FIG. 15 is described below.

The clock 302 corresponds to, for example, the slave side clock 31. The IF unit 301 corresponds to, for example, the transmitter 36 and the receiver 37. The processor 303 and the memory 304 correspond to, for example, the time counter 32, the information analysis units 33 and 33A, delay information request generating unit 34, the communication control unit 35, and the processing units 38 and 38A.

[4] Others

The above structures and functions of the masters 2 and 2A and the slaves 3 and 3A may be selectively adopted or may be combined as appropriate. Accordingly, the above structures and functions may be selectively adopted or combined as appropriate so that the above functions according to the present disclosure may be achieved.

For example, the offset between the slaves 3 and 3A may be calculated according to the following expression (17) and the time may be corrected based on the calculated offset.

$$\text{Offset} = \{(t2'-t1')-(t4'-t3')\}/2 = \{(t2-D2-t1-D3)-(t4-D1-t3-D4)\}/2 \quad (17)$$

In this case, even when a delay in communication processing occurs during communication processing of any messages, the slaves 3 and 3A may correct their times by subtracting the delay in communication processing, thereby making it possible to certainly improve the precision of time synchronization.

The time synchronization according to this example is performed between a communication apparatus as a master and another communication apparatus as a slave in the above example, but time synchronization according to this example may also be performed between, for example, a slave that is in time synchronization with a master, and another slave.

In this case, a slave that is in time synchronization with a master has the same structure and function as the master in the above example and the other slave has the same structure and function as the slave in the above example.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A communication apparatus comprising:
a transmitter that transmits a first message to another communication apparatus;
a receiver that receives a second message from the other communication apparatus; and
a processor that performs time synchronization using the first message and the second message;
wherein the processor generates information regarding a delay in a communication processing of the first message in the transmitter and the second message in the receiver in a communication layer in communication with the other communication apparatus, and the processor performs the time synchronization with the other communication apparatus based on the information regarding the delay in a time synchronization layer above the communication layer,
wherein the time synchronization includes at least one of subtracting the delay in the communication processing from a receiving time of the second message received by the receiver and adding the delay in the communication processing to a transmitting time in the first message transmitted by the transmitter.

2. The communication apparatus according to claim 1, wherein the information regarding the delay includes information regarding modulation methods and code rates of the first message and the second message.

3. The communication apparatus according to claim 1, wherein the information regarding the delay includes a delay time in retransmitting of the first message and the second message or the number of times that the first message and the second message are retransmitted.

4. The communication apparatus according to claim 1, wherein the first message and the second message include one of a synchronization message and a delay information request message.

5. The communication apparatus according to claim 1, wherein the transmitter transmits a response including a result of one of the subtracting and the adding to the other communication apparatus.

6. The communication apparatus according to claim 1, wherein the time synchronization uses Precision Time Protocol.

7. A communication system comprising:
a communication apparatus including a transmitter that transmits a first message to another communication apparatus;
a receiver that receives a second message from the other communication apparatus; and
a processor that performs time synchronization using the first message and the second message;
wherein the processor generates information regarding a delay in a communication processing of the first message in the transmitter and the second message in the receiver in a communication layer in communication with the other communication apparatus, and the processor performs the time synchronization with the other communication apparatus based on the information regarding the delay in a time synchronization layer above the communication layer,
wherein the time synchronization includes at least one of subtracting the delay in the communication processing from a receiving time of the second message received by the receiver and adding the delay in the communication processing to a transmitting time in the first message transmitted by the transmitter.

8. The communication system according to claim 7, wherein the information regarding the delay includes information regarding modulation methods and code rates of the first message and the second message.

9. The communication system according to claim 7, wherein the information regarding the delay includes a delay time in retransmitting of the first message and the second message or the number of times that the first message and the second message are retransmitted.

10. The communication system according to claim 7, wherein the first message and the second message.

11. The communication system according to claim 7, wherein the transmitter transmits a response including a result of one of the subtracting and the adding to the other communication apparatus.

12. The communication system according to claim 7, wherein the time synchronization uses Precision Time Protocol.

13. A communication method comprising:
generating information regarding a delay in a communication processing of a first message in a transmitter and a second message in a receiver in a communication layer in communication with another communication apparatus, and
performing time synchronization with the other communication apparatus based on the information regarding the delay in a time synchronization layer above the communication layer,
wherein the time synchronization includes at least one of subtracting the delay in the communication processing from a receiving time of the second message received by the receiver and adding the delay in the communication processing to a transmitting time in the first message transmitted by the transmitter.

14. The communication method according to claim 13, wherein the information regarding the delay includes information regarding modulation methods and code rates of the first message and the second message.

15. The communication method according to claim 13, wherein the information regarding the delay includes a delay time in retransmitting of the first message and the second message or the number of times that the first message and the second message are retransmitted.

16. The communication method according to claim 13, wherein the first message and the second message include one of a synchronization message and a delay information request message.

17. The communication method according to claim 13, further comprising,
transmitting a response including a result of one of the subtracting and the adding to the other communication apparatus.

18. The communication method according to claim 13, wherein the time synchronization uses Precision Time Protocol.

* * * * *

UNITED STATES PATENT AND TRADEMARK OFFICE
CERTIFICATE OF CORRECTION

PATENT NO. : 8,923,367 B2  
APPLICATION NO. : 13/612013  
DATED : December 30, 2014  
INVENTOR(S) : Masato Okuda Page 1 of 1

It is certified that error appears in the above-identified patent and that said Letters Patent is hereby corrected as shown below:

In the Claims

Column 19, Line 60 (approximately), In Claim 7, delete "acommunication" and insert -- a communication --, therefor.

Column 20, Line 19, In Claim 10, delete "second message." and insert -- second message include one of a synchronization message and a delay information request message. --, therefor.

Column 20, Line 31, In Claim 13, delete "another" and insert -- an other --, therefor.

Signed and Sealed this
Fifth Day of May, 2015

Michelle K. Lee
*Director of the United States Patent and Trademark Office*